Patented Oct. 21, 1930

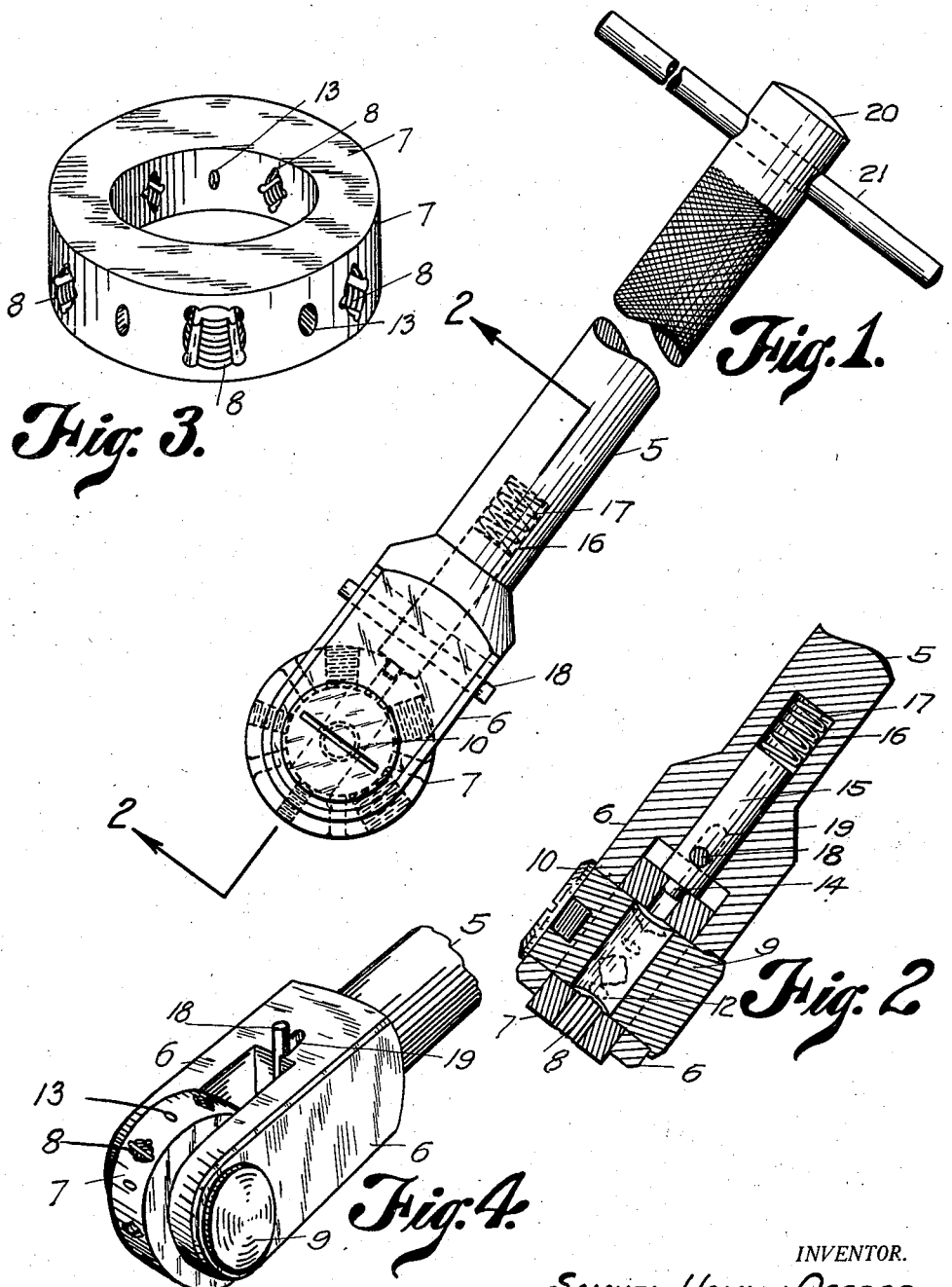

1,779,074

UNITED STATES PATENT OFFICE

SAMUEL H. OSGOOD, OF DENVER, COLORADO

THREADING TOOL

Application filed March 5, 1929. Serial No. 344,414.

My invention relates to screw-threading tools and its main object is to provide a die-carrying tool by the use of which studs and bolts may be threaded or rethreaded in places not readily accessible to the ordinary die stock.

Another object of the invention is to provide a threading tool in which a number of die-openings of different sizes or different threads, formed in one rotary block may be selectively placed in operative position on the stock on which the block is mounted.

Still further objects reside in details of construction and novel arrangements of parts all of which will be clearly brought out in the course of the following description.

In the accompanying drawings showing an embodiment of my invention,

Figure 1 represents a broken elevation of the threading tool,

Figure 2, a section taken on the line 2—2, Figure 1,

Figure 3, an enlarged perspective view of the die block of the tool, and

Figure 4, a perspective view of the end of the stock at which the die block is mounted.

Similar reference numerals designate corresponding parts throughout the views.

Referring further to the drawings, the numeral 5 designates the stock of the threading tool, comprising an elongated handle 20 and a bifurcated head 6 at an end thereof, providing spaced arms between which the die block is mounted.

The handle has at its opposite end a transverse hole to receive a rod 21 which facilitates rotation of the stock in the manual operation of the tool.

The die stock is axially bored at its bifurcated end to provide a recess 16 for a spring-pressed locking bolt hereinafter to be described.

The die block consists of an annular body 7 having at its periphery a number of radial openings 8 which are toothed in the usual manner to cut screw threads on studs or bolts upon which the tool is turned.

The toothed openings may be of varying sizes to cut threads upon bolts of different diameters and their teeth may be formed in various ways to cut different kinds of screw threads.

A headed arbor 9 is held in axially alined openings of the head 6 by means of a screw bolt 10. The arbor provides a support for the rotary die block and the latter has intermediate its threaded openings, small apertures 13 which cooperate with the before mentioned locking bolt to secure the block in its adjusted positions.

The apertures 13 are axially alined with diametrically opposite die openings 8 and the arbor has a transverse opening 12 that is alined with the die opening in the axis of the stock, to admit the bolt or stud that is being threaded.

The locking bolt 15 is slidably fitted in the recess of the head and is held in its locking position by a spring 17.

A reduced stud 14 at the outer end of the bolt engages in the aperture 13 of the die block, in the axis of the stock and a transverse pin 18 on the bolt projects through slots 19 of the stock to provide means for withdrawing the bolt from the die block when it is desired to change the position thereof.

In the operation of the tool, the die opening at the outermost portion of the annular body is in the axis of the handle of the stock, and may be applied to bolts or studs in out of the way places, not accessible to die stocks of ordinary construction.

Mutilated threads may thus be re-threaded or new threads cut without removing the studs or bolts from the machine or structure of which they are parts, and by proper adjustment of the die block, the tool may be adapted to cut threads of different kinds or different sizes.

While the tool is particularly adapted to cut threads in places not readily accessible to the ordinary stock, it may of course, be used under other conditions and by changing the shape of the handle as, for example, to a morse taper shank, the tool may be used in connection with a lathe or a drill press.

It will be further understood without other illustration, that a number of die blocks having different kinds of toothed peripheral openings may be provided to be interchangeably mounted on the arbor of the stock or that the toothed openings may be formed in dies that are inserted in sockets at the periphery of the block.

The die block may also be provided with peripheral openings of either smooth, circular or angular form for the application of a tap in alinement with the handle to cut internal or female screw threads.

The handle of the stock, as shown in the drawings may be roughened to afford a firm hold in the manual operation of the tool.

What I claim and desire to secure by Letters Patent is:

1. A screw threading tool comprising a stock having a bifurcated head, an arbor on the head, a rotary die on the arbor, having peripheral openings, the arbor having a transverse bore alined with one of the openings, and means for locking the die in selective positions.

2. A screw threading tool comprising a stock, having a bifurcated end and provided at said end, with a recess and a slot at a side thereof, a rotary die at said end, having a plurality of peripheral openings, and a spring-pressed locking bolt in the recess, cooperating with certain of the openings to lock the die in selective positions, and having a member projecting through the slot.

3. A screw threading tool comprising a stock having a handle, an arbor at right angles to the handle, having a transverse opening in the axis of the same, a rotary die block on the arbor having a plurality of cutting openings one of which is alined with the handle and the transverse opening, and means for locking the die in selective positions.

In testimony whereof I have affixed my signature.

SAMUEL H. OSGOOD.